(12) United States Patent
Abbondanzio et al.

(10) Patent No.: US 6,883,125 B2
(45) Date of Patent: *Apr. 19, 2005

(54) LOGGING INSERTION/REMOVAL OF SERVER BLADES IN A DATA PROCESSING SYSTEM

(75) Inventors: Antonio Abbondanzio, Raleigh, NC (US); Simon C. Chu, Chapel Hill, NC (US); Gregory William Dake, Durham, NC (US); William Gavin Holland, Cary, NC (US); William Joseph Piazza, Holly Springs, NC (US); Gregory Brian Pruett, Raleigh, NC (US); David B. Rhoades, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 506 days.

This patent is subject to a terminal disclaimer.

(21) Appl. No.: 10/057,643

(22) Filed: Jan. 24, 2002

(65) Prior Publication Data

US 2003/0140267 A1 Jul. 24, 2003

(51) Int. Cl.$^7$ ................................................ G06F 11/00
(52) U.S. Cl. .................... 714/100; 702/34; 702/127; 710/302
(58) Field of Search .................. 714/100; 710/301, 710/302, 304; 702/187, 186, 184, 34

(56) References Cited

U.S. PATENT DOCUMENTS

| | | | |
|---|---|---|---|
| 4,937,825 A | 6/1990 | Ballard et al. | |
| 5,251,150 A | * 10/1993 | Ladner et al. | 702/127 |
| 5,280,398 A | * 1/1994 | Wade et al. | 360/60 |
| 5,367,669 A | 11/1994 | Holland et al. | |
| 5,455,934 A | 10/1995 | Holland et al. | |
| 5,586,250 A | 12/1996 | Carbonneau et al. | |
| 5,680,325 A | 10/1997 | Rohner | |
| 5,801,628 A | 9/1998 | Maloney | |

(Continued)

Primary Examiner—Robert Beausoliel
Assistant Examiner—Aaron Matthew
(74) Attorney, Agent, or Firm—Joseph P. Lally; Martin J. McKinley

(57) ABSTRACT

This invention is comprised of a data processing system containing at least one main processor connected to a system bus, a system memory connected to the system bus and accessible to each of the main processors, a tamper mechanism, and a local service processor. The tamper mechanism is configured to change state each time the system is inserted into a slot in a rack enclosure. The local service processor is connected to the tamper mechanism and configured to update an insertion log upon detecting a change in state of the tamper mechanism. The insertion log provides a count and a history of rack insertions to which the system has been subjected. The system may include a non-volatile storage element which is updated exclusively by the local service processor that contains the insertion log. The insertion log may include an insertion counter. In this embodiment, the local service processor is configured to increment the insertion counter upon each insertion. The local service processor may be further configured to issue an alert if the insertion counter exceeds a predetermined value. In one embodiment, the system further includes a battery backed real-time clock connected to the local service processor. The local service processor is configured to include real-time information corresponding to each insertion event in the insertion log. Each entry in the insertion log may include the identity of the rack enclosure and the geographical address of the slot of the corresponding insertion event. The local service processor may be configured to detect the tamper mechanism state and update the insertion following a power event such that the insertion log update is independent of configuring the data processing system with a boot image.

20 Claims, 4 Drawing Sheets

U.S. PATENT DOCUMENTS

| | | | |
|---|---|---|---|
| 5,822,581 A | * 10/1998 | Christeson | 713/1 |
| 5,835,700 A | 11/1998 | Carbonneau et al. | |
| 5,966,510 A | 10/1999 | Carbonneau et al. | |
| 6,075,441 A | 6/2000 | Maloney | |
| 6,138,250 A | * 10/2000 | Nouri et al. | 714/31 |
| 6,154,790 A | 11/2000 | Pruett et al. | |
| 6,170,059 B1 | 1/2001 | Pruett et al. | |
| 6,177,860 B1 | 1/2001 | Cromer et al. | |
| 6,662,119 B1 | * 12/2003 | Mitchell | 702/34 |
| 6,745,147 B1 | * 6/2004 | Ahrens et al. | 702/127 |

\* cited by examiner

LOGGING INSERTION/REMOVAL OF SERVER BLADES IN A DATA PROCESSING SYSTEM

BACKGROUND

1. Field of the Present Invention

The present invention generally relates to the field of data processing systems and more particularly to a system and method for logging the insertion and removal of circuit boards or blades in a data processing system.

2. History of Related Art

Data processing systems in general and server-class systems in particular are frequently implemented with a server chassis or cabinet having a plurality of racks. Each cabinet rack can hold a rack mounted device (also referred to herein as a blade or server blade) on which one or more general purpose processors and/or memory devices are attached. The racks are vertically spaced within the cabinet according to an industry standard displacement (the "U"). Cabinets and racks are characterized in terms of this dimension such that, for example, a 42U cabinet is capable of receiving 42 1U rack-mounted devices, 21 2U devices, and so forth. Dense server designs are also becoming available, which allow a server chassis to be inserted into a cabinet rack, thus allowing greater densities than one server per 1U. To achieve these greater densities, the server chassis may provide shared components, such as power supplies, fans, or media access devices which can be shared among all of the blades in the server blade chassis.

In a rack-mounted server blade environment, the ability to hot plug server blades is a standard feature. Hot plugging refers to the ability to install and remove a blade without turning off power to the cabinet. When a new server blade is initially installed into a cabinet, the blade generally contains no operating system and no persistent data. Making a newly added blade functional requires deployment software that is capable of recognizing that a new blade has been added, determining the blade characteristics to uniquely identify the blade, powering the blade on, and assigning a functional boot image to the blade. For purposes of this disclosure, a boot image refers generally to software stored in persistent storage that is executed following a power-on or system reset event. The boot image may execute a self test (commonly referred to as a power on self test or POST), load a basic I/O system (BIOS) into memory, and install a functional operating system.

While the rack design beneficially facilitates the easy configuration and expansion of server systems, it also allows server blades to be moved about freely within a cabinet or among different cabinets. In this environment, it is frequently difficult for system administrators to keep track of the location of individual server blades and how many times a server blade has been inserted into a rack. For a variety of reasons, it is highly desirable to maintain accurate information about the location of each server blade. Server blades are typically warranted by their manufacturer for a specified period of time that typically begins when the server blade is first placed in service. Determining the warranty periods of individual blades can quickly prove formidable if the location of each blade is not carefully maintained. Similarly, it is desirable to maintain service logs for each server blade to identify problematic blades and determine the overall cost of operating the blades. Moreover, server blades are typically specified for some maximum of insertions. If blade movement within a system is not tracked, a server blade may be inserted more times than permitted by the blade specification thereby potentially resulting in faulty operation and/or the denial of warranty benefits by the manufacturer. For at least these reasons, it is desirable to implement a system and method in which server blade insertion and movement logs are kept.

SUMMARY OF THE INVENTION

The problems identified above are in large part addressed by a data processing system, referred to as a blade, comprising at least one main processor connected to a system bus, a system memory connected to the system bus and accessible to each of the main processors, a tamper mechanism, and a local service processor. The tamper mechanism is configured to change state each time the system is inserted into a slot in a rack enclosure. The local service processor on each blade is connected to the tamper mechanism and configured to update an insertion log upon detecting a change in state of the tamper mechanism. The insertion log provides a history of at least some rack insertions to which the system has been subjected. The system may include a non-volatile storage element accessible exclusively to the local service processor that contains the insertion log. The insertion log may include an insertion counter. In this embodiment, the local service processor is configured to increment the insertion counter upon each insertion. The local service processor may be further configured to issue an alert if the insertion counter exceeds a predetermined value. In one embodiment, the system further includes a battery backed real-time clock connected to the local service processor. The local service processor is configured to include real-time information corresponding to each insertion event in the insertion log. Each entry in the insertion log may include the identity of the rack enclosure and the geographical address of the slot of the corresponding insertion event. The local service processor may be configured to detect the tamper mechanism state and update the insertion following a power event such that the insertion log update is independent of configuring the data processing system with a boot image.

BRIEF DESCRIPTION OF THE DRAWINGS

Other objects and advantages of the invention will become apparent upon reading the following detailed description and upon reference to the accompanying drawings in which.

Figure 1:
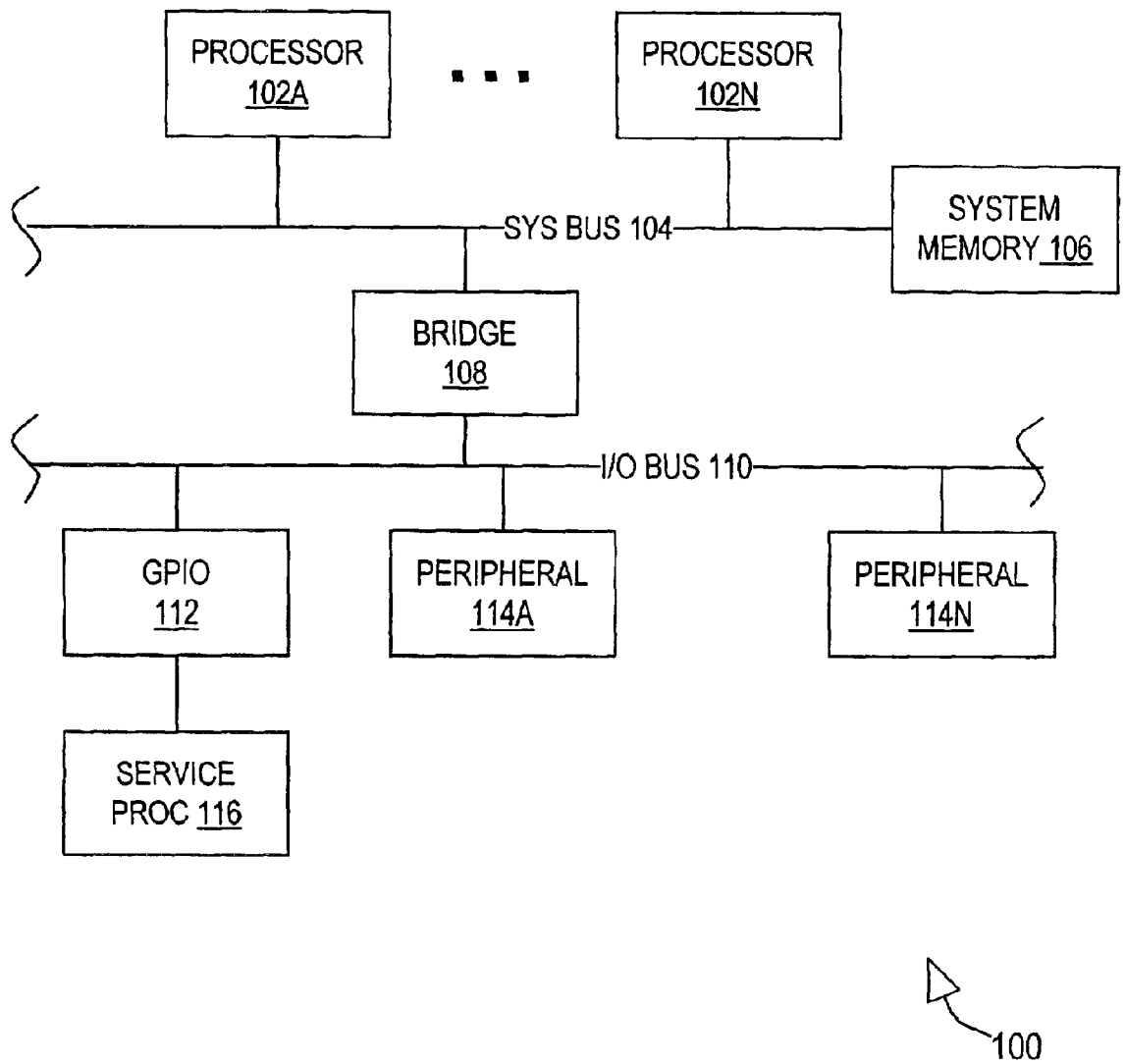
FIG. 1 is a block diagram of selected elements of a data processing system suitable for use with one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Turning now to the drawings, FIG. 1 is a block diagram of selected features of a data processing system 100 suitable for implementing the present invention. Data processing system 100 may be implemented entirely upon a single printed circuit board. In this embodiment, data processing system 100 may be alternatively referred to herein as server blade 100. In the depicted embodiment, server blade 100 includes a set of main processors 102A through 102N (generically or collectively referred to as processor(s) 102) that are connected to a system bus 104. A common system memory 106 is accessible to each processor 102 via system bus 104. The system memory is typically implemented with a volatile storage medium such as an array of dynamic random access memory (DRAM) devices. The depicted architecture of server blade 100 is frequently referred to as a symmetric multiprocessor (SMP) system because each processor 102 has substantially equal access to system memory 106.

In server blade 100, a bus bridge 108 provides an interface between system bus 104 and an I/O bus 110 to which one or more peripheral devices 114A through 114N (generically or collectively referred to as peripheral device(s) 114) as well as a general purpose I/O (GPIO) port are connected. Peripheral devices 114 may include devices such as a graphics adapter, a high-speed network adapter or network interface card (NIC), a hard-disk controller, and the like. I/O bus 110 is typically compliant with one of several industry standard I/O bus specifications including, as a common example, the Peripheral Components Interface (PCI) bus as specified in *PCI Local Bus Specification Rev* 2.2 by the PCI Special Interest Group (www.pcisig.com).

The depicted embodiment of server blade 100 includes a local service processor 116 connected to GPIO port 112. Local service processor 116 is configured to provide support for main processors 102. This support may include, for example, monitoring the power supplied to main processor (s) 102 and, in the event of a blade crash, initiating a restart of the main processors.

Figure 2:
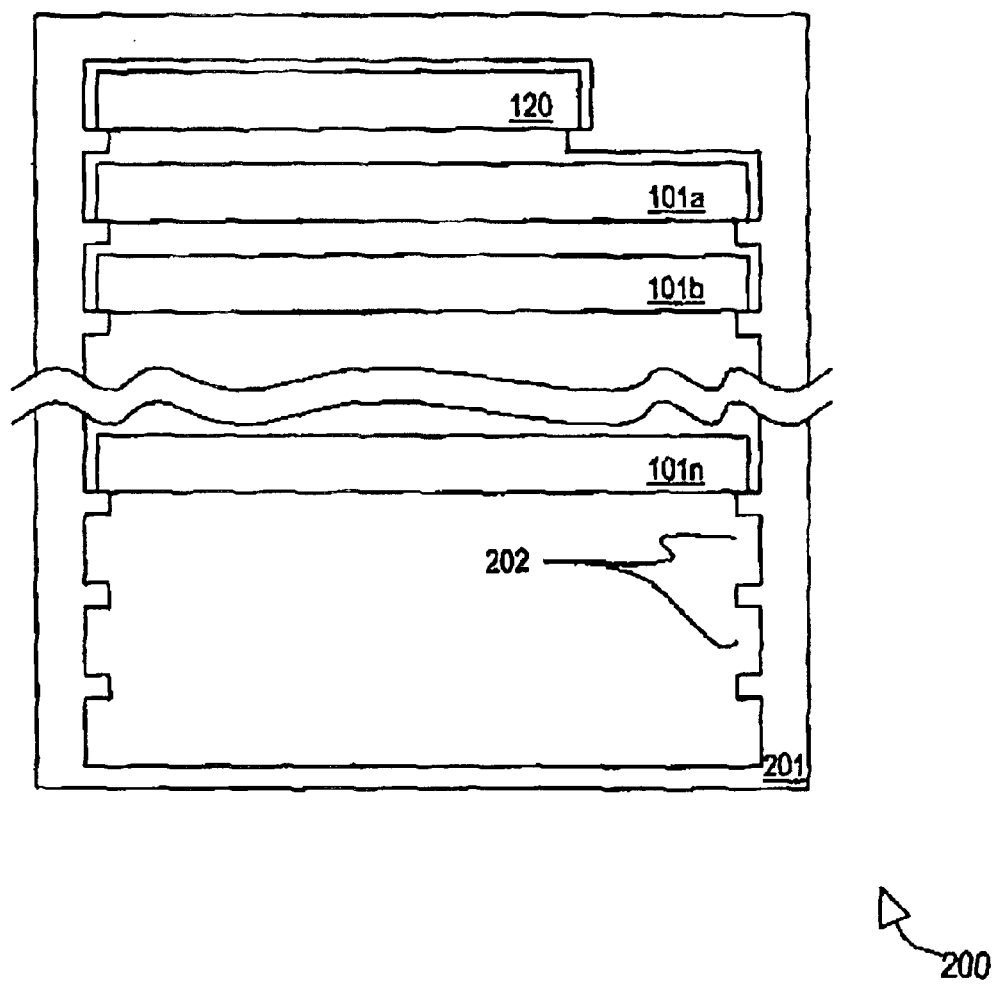
FIG. 2 depicts a data processing network according to one embodiment of the invention.

Turning now to FIG. 2, a data processing network 200 according to one implementation of the present invention is depicted. Data processing network 200 includes a rack enclosure or cabinet 201 that includes a plurality of slots or racks 202. Each rack 202 is configured to receive a rack mounted device such as a server blade chassis identified by reference numerals 101a through 101n (generically or collectively referred to as server blade chassis 101) via a suitable connection mechanism such as a traditional edge connector. Each server blade chassis 101 typically contains one or more server blades 100 as described with respect to FIG. 1. In one implementation, each server blade chassis 101 is a 4U component that may include as many as 16 server blades 100. Thus, the depicted embodiment of network 200 includes a set of server blade chassis 101, each of which includes one or more server blades 100. Each server blade 100 within server blade chassises 101a through 101n is typically connected to a local area network (LAN) through its NIC(s) such that server blades 100 in system 200 can communicate with each other. Network 200 may itself be connected to an external network such as the Internet through a gateway (not depicted) or other suitable network device.

Portions of the present invention may be implemented as a sequence of processor executable instructions (software) for locally maintaining a log of the insertion and removal of a server blade in a data processing network where the instructions are stored on a computer readable medium. During execution, portions of the software may reside in a volatile storage element such as the system memory 106 depicted in FIG. 1 or an external or internal cache memory (not depicted) of main processor(s) 102. At other times, portions of the software may be stored on a non-volatile storage medium such as a floppy diskette, hard disk, CD ROM, DVD, magnetic tape, or other suitable storage medium. In addition, portions of the software may be executed by management module 120 while other portions are executed by local service processors 116 of each server blade 100.

Figure 3:
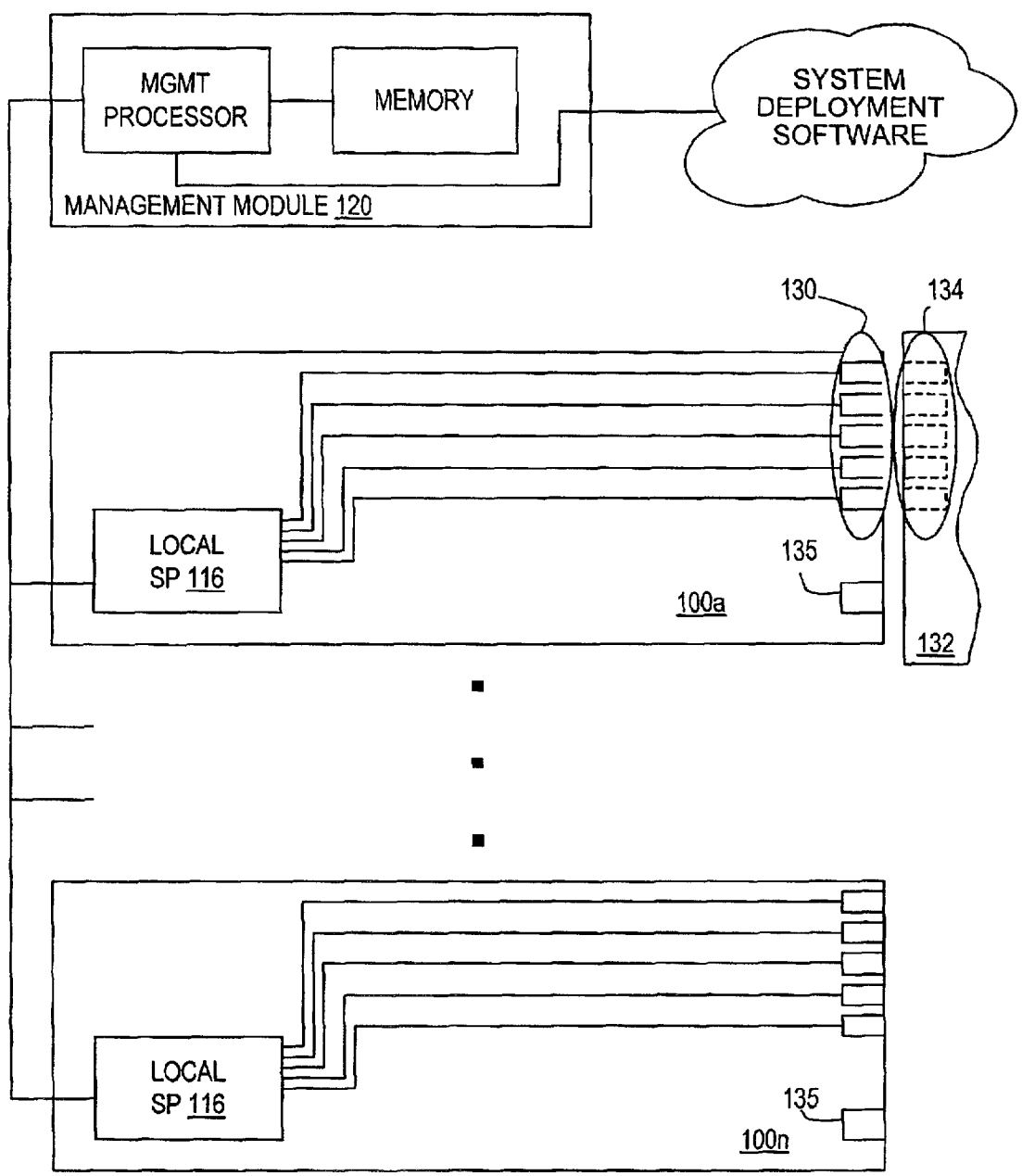
FIG. 3 illustrates additional detail of the data processing network of FIG. 2.

Turning now to FIG. 3, the local service processor 116 of each server blade 100 is connected to a set of physical identification (PID) connectors 130 that typically comprise a portion of the edge connectors of server blade 100. PID connectors 130 are configured to connect to a corresponding set of PID pins 134 of an edge connector 132 residing in each slot 202 of cabinet 201. The PID pins 134 of each connector 132 are uniquely wired to either ground or VDD to produce a binary value indicative of the physical position of the slot 202 in which the connector is positioned. The PID connectors 130 thus provide local processor 116 with means for determining the physical slot or geographical address occupied by the corresponding server blade 100.

Server blades 100 as depicted in FIG. 3 are further configured with a tamper latch 135. Tamper latch 135 comprises a mechanism that indicates whether a corresponding device or apparatus has been altered. In the case of server blades 100, tamper latch 135 may be configured to transition from a first state to a second state when the corresponding server blade is inserted into (or removed from) its slot. Tamper latch 135 may employ an impedance element that is electrically altered when the corresponding server blade 100 is removed from its slot. The impedance element preferably remains in this altered state until reset by system software. Thus, tamper latch 135 may include a persistent impedance element that changes impedance when its corresponding server blade 100 is inserted into or removed from its slot.

The local service processors 116 of server blades 100 are directly connected to system power connector pins of their server blades such that local service processors 116 are powered on whenever they are installed in their slots 202. In response to a power-up event (meaning a power-on of the local service processor or a hardware reset), local service processors 116 immediately read their corresponding geographical address or slot location as well as chassis identification information (that is provided to them through separate connectors (not depicted)). In addition, a local service processor will read its corresponding tamper latch to determine if the blade has been removed since the last power up event. If the tamper latch is broken (in an impedance condition indicating that the blade has been removed), local service processor 116 increments the insertion count, then resets tamper latch 135. In addition, local service processor 116 is configured to log insertion information in a non-volatile insertion log.

Figure 4:
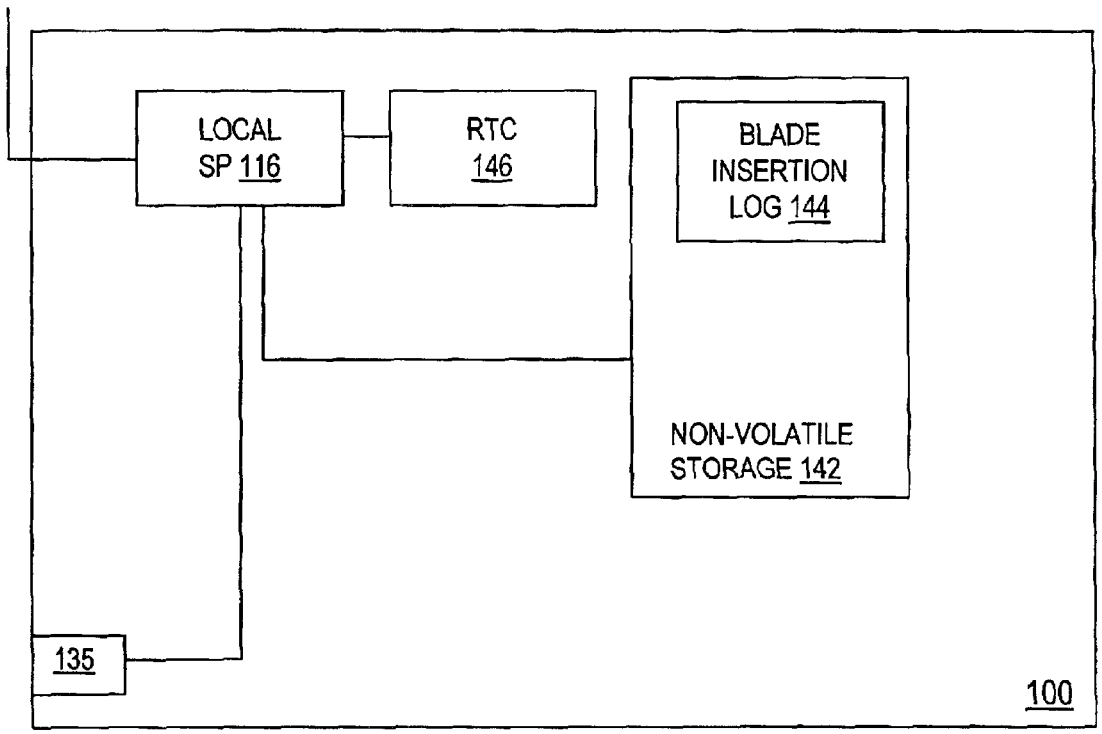
FIG. 4 illustrates selected details of a local service processor and a corresponding non-volatile log storage device according to one embodiment of the invention.
Figure 5:
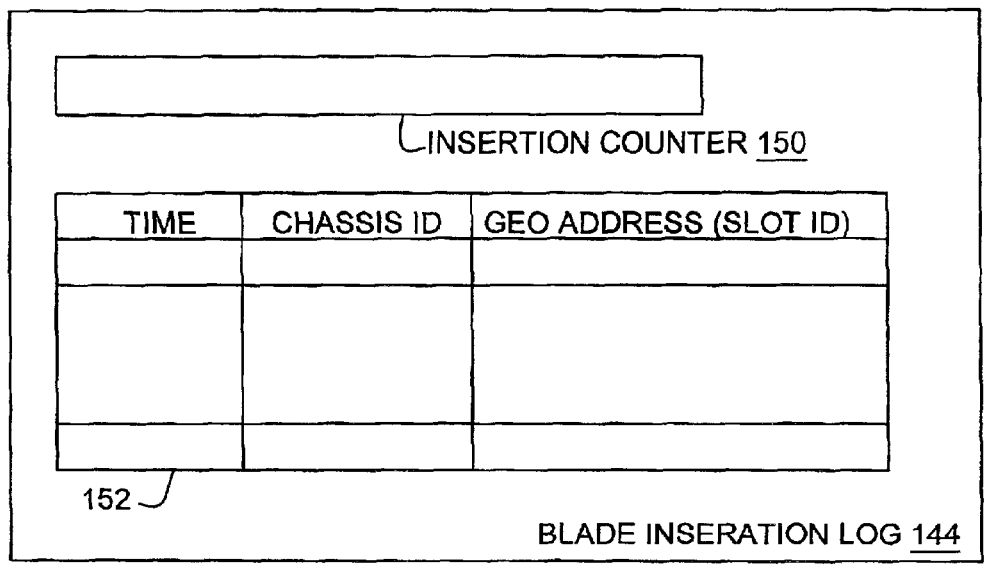
FIG. 5 illustrates additional detail of the log storage device of FIG. 4 according to one embodiment of the invention.

Referring now to FIG. 4 and FIG. 5, one embodiment of system 100 has local service processor 116 connected to a non-volatile storage element 142. Storage element 142 is preferably writeable only by local service processor 116 (i.e., is read-only to main processors 102) and may be implemented with a flash memory card or other suitable non-volatile storage device. Storage element 142 includes information comprising a blade insertion log 144.

Blade insertion log 144 typically includes a detailed history of the movement of server blade 100 since its original in-service date. Blade insertion log 144 may include, for example, a blade insertion table 152. Table 152 as depicted in FIG. 5 includes a row for each insertion event. Each row of table 152 indicates the time of the corresponding insertion event, identification information about the chassis in which the blade was inserted, as well as the physical slot location (geographical address) within the chassis.

In addition, blade insertion log 144 may include an insertion counter 150. If, in response to a power on event or hardware reset, local service processor 116 determines that its tamper latch 135 has been broken, the service processor will increment insertion counter 150 and update blade insertion log 144 by including a new row of information in the log. If the number of rows in log 144 is limited, local service processor may be configured to overwrite the oldest insertion data when the log is full. Optionally, the local service processor may be configured to only log insertion events where the physical position of the blade indicates that the blade has been relocated since the last insertion.

The insertion counter 150 provides a secure count of the number of physical insertion to which the server blade has been subjected. If the insertion counter 150 exceeds a predetermined value, local service processor 116 may issue some form of alert, warning message, interrupt, or the like to indicate that the blade has been inserted/remove more times than permitted by specification thereby alerting the system administrator to a potential problem. The depicted embodiment of system 100 further includes a real-time clock (RTC) 146 connected to local service processor 116 enabling the inclusion of a date stamp in blade insertion table 152. In the preferred embodiment, RTC 146 is a battery backed persistent clock that remains constantly operational.

When a server blade 100 is inserted into a vacant slot 202 of cabinet 201 thereby altering the state of tamper latch 135, the local service processor 116 performs the insertion log update described above and may send an asynchronous alert. Because the insertion log update is initiated in response to the insertion event itself, the logging mechanism described herein is independent of any configuration of the server blade 100. Thus, even if a blade is inserted and removed from a slot without ever booting the blade, the blade's insertion log will reflect the insertion.

It will be apparent to those skilled in the art having the benefit of this disclosure that the present invention contemplates a system and method for logging resource movements in a data processing network. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A data processing system, comprising:
   at least one main processor connected to a system bus;
   a system memory connected to the system bus and accessible to each of the main processors;
   a tamper mechanism configured to change state responsive to insertion of the system into a slot in a rack enclosure; and
   a local service processor, connected to the tamper mechanism and configured to update an insertion log responsive to detecting a changed state of the tamper mechanism, wherein the insertion log provides a history of at least some rack insertions to which the system has been subjected.

2. The system of claim 1, further comprising a non-volatile storage element accessible exclusively to the local service processor and containing the insertion log.

3. The system of claim 2, wherein the insertion log includes an insertion counter, and wherein the local service processor is configured to increment the insertion counter upon each insertion.

4. The system of claim 3, wherein the local service processor is configured to issue an alert responsive to the insertion counter exceeding a predetermined value.

5. The system of claim 1, further comprising a battery backed real-time clock connected to the local service processor, wherein the local service processor is configured to include real-time information corresponding to each insertion event in the insertion log.

6. The system of claim 1, wherein each entry in the insertion log includes the identity of the rack enclosure and the geographical address of the slot of the corresponding insertion event.

7. The system of claim 1, wherein the local service processor is configured to detect the tamper mechanism state and update the insertion log responsive to a power event such that the insertion log update is independent of configuring the data processing system with a boot image.

8. A data processing network, comprising:
   a plurality of server blades connected to a common network, each blade comprising at least one main processor connected to a system bus, a system memory connected to the system bus and accessible to each of the main processors, a tamper mechanism configured to change state responsive to insertion of the system into a slot in a rack enclosure; and a local service processor, connected to the tamper mechanism and configured to update an insertion log responsive to detecting a changed state of the tamper mechanism, wherein, the insertion log provides a history of at least some rack insertions to which the system has been subjected.

9. The network of claim 8, further comprising a non-volatile storage element accessible exclusively to the local service processor and containing the insertion log.

10. The network of claim 9, wherein the insertion log includes an insertion counter, and wherein the local service processor is configured to increment the insertion counter upon each insertion.

11. The network of claim 10, wherein the local service processor is configured to issue alert responsive to the insertion counter exceeding a predetermined value.

12. The network of claim 8, further comprising a battery backed real-time clock connected to the local service processor, wherein the local service processor is configured to include real-time information corresponding to each insertion event in the insertion log.

13. The network of claim 8, wherein each entry in the insertion log includes the identity of the rack enclosure and the geographical address of the slot of the corresponding insertion event.

14. The network of claim 8, wherein the local service processor is configured to detect the tamper mechanism state and update the insertion log responsive to a power event such that the insertion log update is independent of configuring the data processing system with a boot image.

15. A computer program product comprising a set of computer executable instructions for logging server blade insertions in a data processing network, the instructions being stored on a computer readable medium, comprising:

computer code means for determining the state of a tamper latch of the server blade; and computer code means, responsive to detecting a tamper latch state change, for updating an insertion log wherein the insertion log is local to the server blade and provides a history of at least some rack insertions to which the system bus been subjected.

16. The computer program product of claim 15, wherein the insertion log comprises at least a portion of a non-volatile storage element accessible exclusively to the local service processor.

17. The computer program product of claim 16, wherein the insertion log includes an insertion counter, and wherein the computer program product is configured to increment the insertion counter upon each insertion.

18. The computer program product of claim 17, wherein the code means is configured to issue an alert responsive to the insertion counter exceeding a predetermined value.

19. The computer program product of claim 15, wherein each entry in the insertion log includes the identity of the rack enclosure and the geographical address of the slot of the corresponding insertion event.

20. The computer program product of claim 15, wherein the local service processor is configured to detect the tamper mechanism state and update the insertion log responsive to a power event such that the insertion log update is independent of configuring the data processing system with a boot image.

* * * * *